Figure 1:
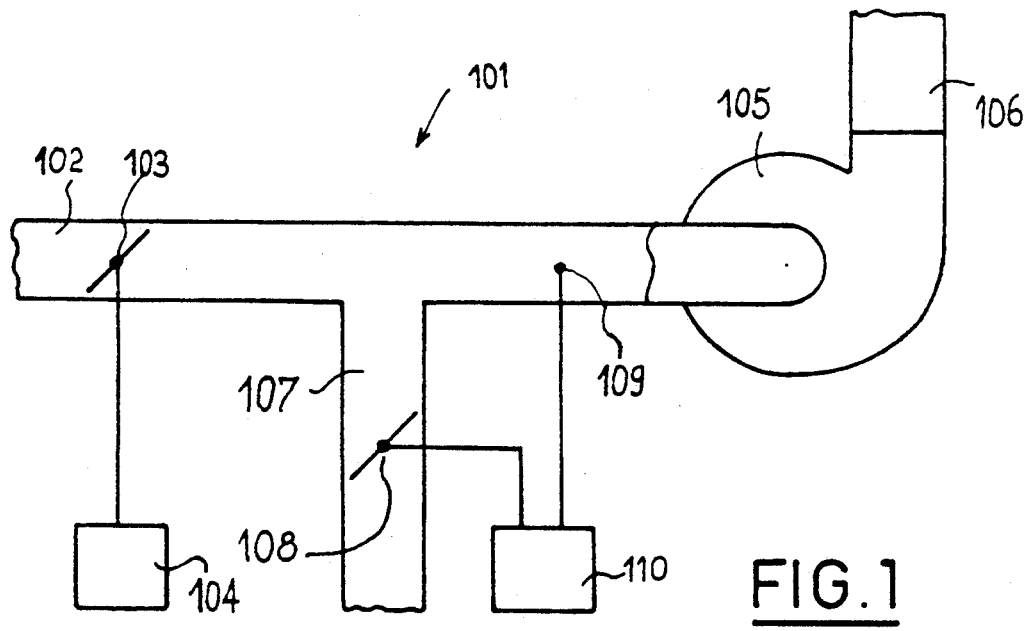

United States Patent [19]

Pernet et al.

[11] Patent Number: 5,291,513
[45] Date of Patent: Mar. 1, 1994

[54] METHOD AND DEVICE FOR EXHAUSTING GASES OR FUMES FROM A METALLURGICAL CONTAINER AND AN ELECTRIC FURNACE PROVIDED WITH SAID EXHAUST DEVICE

[75] Inventors: Daniel Pernet, Metz; Jacques Blum, Argancy, both of France

[73] Assignee: Unimetal, Metz, France

[21] Appl. No.: 97,887

[22] Filed: Jul. 28, 1993

Related U.S. Application Data

[62] Division of Ser. No. 886,167, May 21, 1992.

[30] Foreign Application Priority Data

May 22, 1991 [FR] France .................... 91 06166
May 22, 1991 [FR] France .................... 91 06169

[51] Int. Cl.⁵ ............... B08B 13/00; C21B 13/12; F27B 3/08; F27D 17/00
[52] U.S. Cl. .................... 373/9; 266/144; 110/162
[58] Field of Search ............... 373/8, 9; 266/144, 158, 266/159; 110/162; 454/255, 340, 358, 256

[56] References Cited

U.S. PATENT DOCUMENTS

| | | | |
|---|---|---|---|
| 3,570,831 | 3/1971 | Rouanet | 266/144 |
| 3,617,043 | 11/1971 | Hirao | 266/144 |
| 4,402,303 | 9/1983 | Koenneman | 110/162 |
| 4,437,186 | 3/1984 | Inai | 373/9 |
| 4,450,569 | 5/1984 | Hagendoorn | 373/9 |
| 4,477,910 | 10/1984 | Nijhawan et al. | 373/9 |

FOREIGN PATENT DOCUMENTS

| | | |
|---|---|---|
| 26118 | 4/1981 | European Pat. Off. |
| 1458876 | 4/1969 | Fed. Rep. of Germany |
| 61-510 | 1/1986 | Japan |
| 920982 | 3/1963 | United Kingdom |
| 1152888 | 5/1969 | United Kingdom |

Primary Examiner—Bruce A. Reynolds
Assistant Examiner—John A. Jeffery
Attorney, Agent, or Firm—Oblon, Spivak, McClelland, Maier & Neustadt

[57] ABSTRACT

The inside of the metallurgical container is connected to a fan (105) through an exhaust duct (102). An additional gas is introduced in the intake part of the fan (105) preferably through the duct (102). The additional gas introduction flow is regulated in such manner that the gas pressure in the intake part of the fan (105) is maintained at a fixed value, via an adjusting valve (108) preferably placed in an additional duct (107) connected to the exhaust duct (102). A control system (110) regulates the opening and closing of the adjusting valve (108) in such manner as to maintain the gas pressure in the intake part of the fan (105) constant.

7 Claims, 2 Drawing Sheets

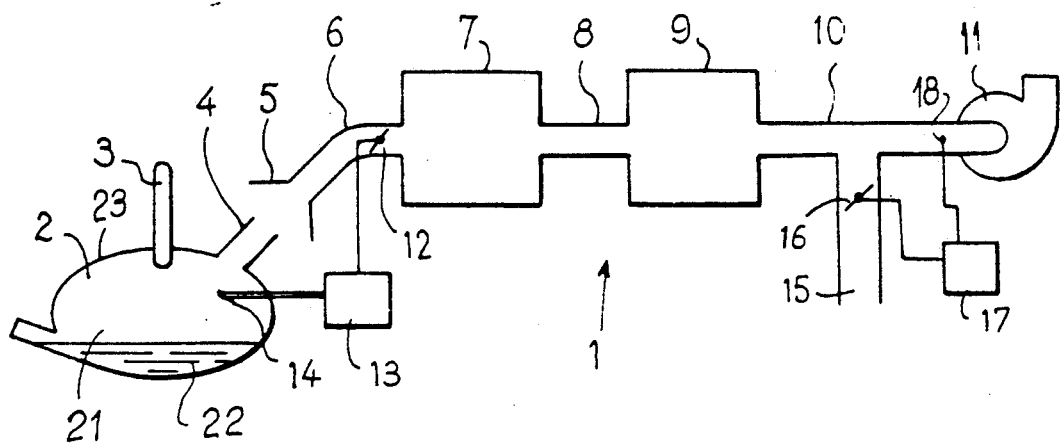
FIG·3

METHOD AND DEVICE FOR EXHAUSTING GASES OR FUMES FROM A METALLURGICAL CONTAINER AND AN ELECTRIC FURNACE PROVIDED WITH SAID EXHAUST DEVICE

This is a division of application Ser. No. 07/886,167 filed May 21, 1992.

The invention relates to the exhaust of gases or fumes in a metallurgical container such as an electric arc furnace.

There are employed in the metallurgical industry and in particular steelworks, metallurgical containers such as electric arc furnaces in which steels or alloys are produced from metallurgical substances which are usually in the liquid state inside the furnace during production The chemical reactions produced inside the container, with or without supply of reactive or stirring gases, are accompanied by an emanation, at a variable flow with respect to time, of fumes and gases which must be exhausted from the inside of the container.

In the case of electric furnaces, the container is substantially closed (or airtighted) and the gases come from the mass of metallurgical substances which are in the molten state or in process of melting.

The rate of flow of the gases or fumes produced in the furnace may vary in the course of production between a very low value and a high value.

The gases or the fumes are exhausted in known devices which usually comprise, in the extension of the emission stage, an exhaust hood, a combustion chamber, filters, and a fan, all these elements being connected in series in this order by ducts. The duct which connects the filters to the fan is provided with an element for adjusting the pressure drop controlled by a regulator responsive to a measurement of the pressure in the enclosure of the furnace in the vicinity of the roof of the latter. This regulator has for purpose to maintain the pressure of the furnace at around the outside atmospheric pressure so as to limit either entry of air to the interior of the furnace or emissions of gases or fumes to the exterior of the furnace.

These devices have drawbacks:
on one hand, they do not have a stable flow operating range which is sufficiently extended, in particular toward the low flows. Indeed, it is necessary to have sometimes very high flows, sometimes very low flows and the systems capable of very high flows are not stable toward the very low flows, on the other hand, they do not have a sufficiently short response time when it is necessary to change from a low flow to a high flow. When a blast of gases or fumes must be absorbed, in order to achieve a large amount of exhaust at the outlet of the furnace, it is first of all necessary to partly empty the filters, the combustion chamber and the ducts so as to lower the pressure at the intake of the exhaust device. This might take about 30 seconds, which is very long.

French patent No. 79-21972 (IRSID) proposes a gas exhaust method and device of an arc furnace which partly overcome these drawbacks. This method employs a device in which the emission stage is provided with an element for adjusting the pressure drop controlled by the pressure in the furnace; the duct connecting the exhaust hood to the combustion chamber being provided with an element for adjusting the pressure drop controlled by the pressure at the inlet of the hood. This device providing a double regulation of pressure in regions so close to each other in the fumes exhaust circuit may result in a certain instability upon sudden variations in the conditions of operation of the furnace.

An object of the invention is to provide a system for exhausting gases or fumes emitted by a metallurgical container, such as an electric arc furnace, which is capable of operating over a very wide range of flow, in particular at a very low flow and at a very high flow, which has a short response time and stable conditions of operation.

To this end, the invention provides a method for exhausting gases or fumes in a metallurgical container in which the gases or fumes are produced in variable amounts with respect to time, in particular by reactions from the melting or conversion of metallurgical substances, the inside of the metallurgical container being connected to the intake part of pumping means, characterized in that it comprises introducing an additional gas stream in an introduction zone communicating with the intake part of the pumping means effecting the exhaust of the gases produced in the metallurgical container, and regulating the flow of introduction of the additional gas stream in such manner that the gas pressure in the intake part of the pumping means located on the downstream side of the zone of introduction of the additional gas stream relative to the direction of flow of the gases, is maintained at a fixed value, irrespective of the amount of gases produced in the metallurgical container.

Preferably, the additional gas stream is introduced in a duct connecting the inside of the metallurgical container to the intake part of the pumping means so as to be mixed with the gases produced in the metallurgical container.

The invention also provides a device for collecting gases or fumes emitted by an electric arc furnace or by a similarly metallurgical container in the inside of which is effected melting and/or the conversion of a metallurgical charge, with production of gases or fumes, and a stage emitting gases or fumes out of the furnace, in communication with the inside of the furnace, the collecting device comprising a hood exhausting gases or fumes in the emission stage of the furnace, a combustion chamber for the gases or fumes, a filter and a fan having an intake part, connected in series and in this order through a first duct connecting the exhaust hood to the combustion chamber, a second duct connecting the combustion chamber to the filter, and a third duct connecting the filter to the fan, characterized in that it comprises:

a first element for adjusting pressure drop disposed in the first duct controlled by a first regulating means connected for the control thereof to a pressure sensor disposed in the inside of the furnace in the vicinity of the emission stage, an additional duct connected to the third duct at one of the ends thereof and an opening out to the open air at the other end thereof, and a second element for adjusting pressure drop disposed in the additional duct and controlled by a second regulating means connected, for the control thereof, to a pressure sensor disposed in the third duct in proximity to the intake part of the fan.

The elements for adjusting pressure drop may be butterfly valves or sluice valves and the fan may be a centrifugal fan.

The regulation of the element adjusting pressure drop located in the first duct connecting the hood to the combustion chamber maintains the pressure inside the furnace at around the atmospheric pressure outside said furnace.

The regulation of the element for adjusting pressure drop located in the additional duct maintains the pressure at the intake of the fan at around the pressure corresponding to the maximum flow of said fan.

The invention lastly provides an electric arc furnace equipped with a device for collecting gases or fumes according to the invention.

Figure 2:
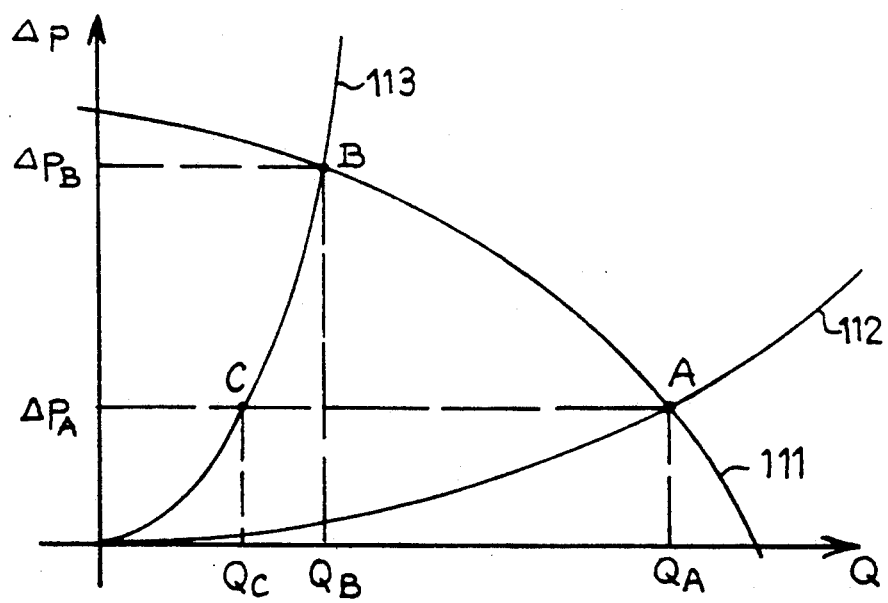

The invention will now be described with reference to the accompanying drawings, in which:

FIG. 1 is a schematic view of a device for carrying out the method according to the invention, FIG. 2 is a flow/pressure diagram characteristic of the operation of an exhaust system comprising a duct with a butterfly valve and a fan, FIG. 3 is a schematic view of an electric arc furnace equipped with a collecting device according to the invention.

The device generally designated by the reference character 101 in FIG. 1 comprises an exhaust duct 102 provided for example with a butterfly valve 103 whose position is controlled by a regulator 104. The duct 102 is connected to the intake of a fan 105 which discharges into a flue 106. The fan is for example a centrifugal fan. An additional duct 107 communicating with the open air is connected to the duct 102 between the valve 103 and the fan 105. The duct 107 is provided with a valve, for example a butterfly valve 108, controlled by a regulator 110 connected to a pressure sensor 109 located in the vicinity of the intake of the fan 105.

The principle of operation of such a device may be explained by reference to the operation of an exhaust system without an additional duct and with respect to FIG. 2. Δp represents the pressure drop, either between the upstream side and downstream side of the valve 103, or between the intake and the discharge of the fan 105; Q represents the flow, either in the duct 102 or in the fan.

As concerns the fan, the flow Q is related to the pressure drop by a relation which corresponds to the curve 111 of FIG. 2.

As concerns the duct 102, the flow and the pressure drop are related by a relation which corresponds to the curves 112 and 113 of FIG. 2. The curve 112 corresponds to a completely open valve 103; the curve 113 corresponds to the valve 103 closed to the allowable maximum for avoiding instabilities.

When the valve 103 is completely open, the operating point is at A, the intersection of the curves 111 and 112, and the flow is $Q_A$; this is the maximum value of the allowable flow.

When the valve 103 is almost closed, in the absence of the duct 107, the operating point is B; it corresponds to a non-negligible residual flow $Q_B$.

With the aid of the duct 107, the exhaust pressure may be maintained at a constant value $\Delta P_A$ corresponding to the maximum flow of the fan. For this purpose, the regulator acts on the valve 108 in such manner that the sum of the flows through the ducts 102 and 107 is constant: when the valve 103 is wide open, the valve 108 is almost closed and vice versa.

Under these conditions, the pressure drop in the valve 103 remains constant and equal to $\Delta P_A$ so that, when the valve 103 is almost closed, the point of operation becomes C; it corresponds to a leakage flow $Q_C$ which is distinctly lower than $Q_B$.

The device according to the invention can therefore operate over a flow range between $Q_C$ and $Q_A$ which is much more extended toward the low flows than the operating range of devices of the prior art.

As an example, it is usual that $\Delta P_A$ have a 100 mm pressure head and $\Delta P_B$ a 500 mm pressure head. As the flow in the duct 102 varies as the square root of the pressure drop, with the method according to the invention, flows $Q_C = 0.45\ Q_B$ can be reached with no instability of the butterfly valve.

The method according to the invention therefore consists in exhausting the gases or fumes by means of a fan 105 and introducing, at the intake of the fan 105, an additional flow of air or gas which is so regulated that the pressure at the intake of the fan remains low and corresponds to the maximum intake flow of said fan.

This method is of particular utility when employed for exhausting fumes from an electric arc furnace, in particular when an airtight furnace is desired.

For this purpose, there is for example employed a device such as that shown in FIG. 3.

The arc furnace 2 provided with three roof electrodes 3, only one of which is shown, defines an inside 21 (or laboratory) intended to receive the metal charge 22 to be melted and comprises a stage 4 emitting gases or fumes constituted by an aperture in the roof 23 and a duct element. This furnace is equipped with a device for collecting fumes according to the invention, generally designated by the reference 1. This device 1 comprises an exhaust hood 5 located in facing relation to the emission stage 4. This exhaust hood is connected through a duct 6 to a combustion chamber 7 connected through a duct 8 to filters 9 connected through a duct 10 to a fan 11. The duct 6 is provided with an element 12 for adjusting the pressure drop, constituted for example by a butterfly valve or a sluice valve. This element 12 is controlled by a regulator 13 controlled by a pressure sensor 14 located in the furnace in the vicinity of the emission stage 4. Connected to the duct 10 is an additional air exhaust duct 15 open to the atmosphere. This additional duct is provided with an element 16 for adjusting the pressure drop, constituted for example by a butterfly valve or a sluice valve. This element 16 is controlled by a regulator 17 controlled by a pressure sensor 18 located in the vicinity of the intake of the fan 11.

In operation of the device the regulator 13 adjusts the position of the element 12 in such manner that the pressure in the furnace remains at around the atmospheric pressure outside the furnace; in the absence of a large emission of gases or fumes, the element 12 is almost closed; when there is a large emission of gases, this element is wide open, the regulator 16 maintains the pressure at the intake of the fan at the level corresponding to the maximum flow of the fan This corresponds to a small pressure difference with respect to atmospheric pressure When the flow from the furnace is low, the means 16 is almost closed and vice versa.

When the gas emission is low, this device may operate in a stable manner with a very low exhaust flow at the hood 5 and the pressure on the downstream side of the element 12 is low. The pressure in the furnace is maintained at around atmospheric pressure.

If a blast of gases or fumes suddenly occurs, the element 12 suddenly opens. As the pressure is low in the downstream part of the duct 6, in the combustion chamber 7, in the duct 8, in the filter 9 and in the duct 10, the blast of gases or fumes is exhausted in the device 1 and the response time of the furnace is very short. A response time of one second has been observed as against 30 seconds with devices of the prior art.

When permanent operating conditions are reached, the element 12 is open and the element 16 closed; the fan is employed at full capacity for exhausting the gases or fumes emitted by the furnace.

It is clear that, at the end of the emission of gases, the element 12 may be very rapidly closed and maintain a very low exhaust flow at the hood, which avoids a pressure drop in the furnace; progressively, the element 16 opens.

The device according to the invention thus permits achieving stable operation over a very wide range of exhaust flows at the hood; its response time is very short. This permits at the same time well-regulating the pressure in the furnace, avoiding spurious entry of air when the emissions of gases or fumes are low, and well-exhausting the gases or fumes when their production suddenly increases.

We claim:

1. Device for collecting gases or fumes emitted by an electric arc furnace (2) in the inside of which is effected the melting and/or the conversion of a metallurgical charge, with the production of gases or fumes, and comprising a stage (4) emitting gases or fumes out of the furnace, in communication with the inside of the furnace, the collecting device comprising a hood (5) for exhausting the gases or fumes in the emission stage (4) of the furnace, a chamber (7) for the combustion of the gases or fumes, a filter (9) and a fan (11) having an intake part, connected in series and in this order through a first duct (6) connecting the exhaust hood (5) to the combustion chamber (7), a second duct (8) connecting the combustion chamber to the filter, and a third duct (10) connecting the filter to the fan, characterized in that the device comprises:

a first element (12) for adjusting pressure drop disposed in the first duct (6) controlled by a first regulating means (13) connected, for the control thereof, to a pressure sensor (14) disposed in the inside of the furnace, in the vicinity of the emission stage (4), an additional duct (15) connected to the third duct (10) at one of the ends thereof and opening out to the open air at the other end thereof, and a second element (16) for adjusting pressure drop disposed in the additional duct (15) and controlled by a second regulating means (17) connected, for the control thereof, to a pressure sensor (18) disposed in the third duct (10) in proximity to the intake part of the fan (11).

2. Device according to claim 1, wherein the first element (12) for adjusting pressure drop located in the first duct (6) connecting the exhaust hood (5) to the combustion chamber (7) is a butterfly valve or a sluice valve.

3. Device according to claim 1, wherein the second element (16) for adjusting the pressure drop located in the additional duct (15) is a butterfly valve or a sluice valve.

4. Device according to claim 1, wherein the fan is a centrifugal fan.

5. Device according to claim 1, wherein the regulating means (13) of the first element (12) for adjusting pressure drop located in the first duct (6) connecting the exhaust hood (5) to the combustion chamber (7) maintains the pressure inside the furnace at around the atmospheric pressure, outside the furnace.

6. Device according to claim 1, wherein the regulating means (17) of the second element (16) for adjusting pressure drop located in the additional duct (15) maintains the exhaust pressure at the intake of the fan (11) at around the pressure corresponding to the maximum flow of the fan.

7. An electric arc furnace equipped with a device according to any one of the claims 1 to 6.

* * * * *